(12) United States Patent
Jungreis

(10) Patent No.: US 6,881,509 B2
(45) Date of Patent: Apr. 19, 2005

(54) FUEL CELL SYSTEM POWER CONTROL METHOD AND SYSTEM

(75) Inventor: Aaron M. Jungreis, Cary, NC (US)

(73) Assignee: ABB Research Ltd., Zurich (CH)

( * ) Notice: Subject to any disclaimer, the term of this patent is extended or adjusted under 35 U.S.C. 154(b) by 26 days.

(21) Appl. No.: 10/024,744

(22) Filed: Dec. 19, 2001

(65) Prior Publication Data
US 2003/0113595 A1 Jun. 19, 2003

(51) Int. Cl.[7] .................. H01M 8/04; H01M 16/00; H02J 9/00
(52) U.S. Cl. .................. 429/23; 429/22; 429/24; 429/25; 307/64; 307/66
(58) Field of Search .................. 429/22, 24, 25, 429/13, 23; 307/64, 66

(56) References Cited

U.S. PATENT DOCUMENTS

| | | | |
|---|---|---|---|
| 4,670,702 A | 6/1987 | Yamada et al. | 320/21 |
| 4,728,866 A | 3/1988 | Capewell et al. | 315/224 |
| 4,894,587 A | 1/1990 | Jungreis et al. | 315/200 R |
| 4,931,947 A | 6/1990 | Werth et al. | 364/492 |
| 4,962,462 A | 10/1990 | Fekete | 364/492 |
| 5,448,141 A | 9/1995 | Kelley et al. | 318/254 |
| 5,631,532 A | 5/1997 | Azuma et al. | 320/5 |
| 5,637,414 A | 6/1997 | Inoue et al. | 429/13 |
| 5,991,670 A | 11/1999 | Mufford et al. | 701/22 |
| 6,134,124 A | 10/2000 | Jungreis et al. | 363/34 |
| 6,169,390 B1 | 1/2001 | Jungreis | 322/4 |
| 6,177,736 B1 | 1/2001 | Raiser | 307/17 |
| 6,184,593 B1 | 2/2001 | Jungreis | 307/64 |
| 6,287,715 B1 | 9/2001 | Faris et al. | 429/22 |
| 6,304,006 B1 | 10/2001 | Jungreis | 307/64 |
| 6,316,134 B1 | 11/2001 | Cownden et al. | 429/19 |
| 6,559,621 B1 * | 5/2003 | Corless et al. | 320/103 |
| 6,630,259 B1 * | 10/2003 | Fuglevand | 429/13 |

* cited by examiner

Primary Examiner—John S. Maples
(74) Attorney, Agent, or Firm—Paul R. Katterle, Esq.

(57) ABSTRACT

A fuel cell is placed in parallel with a battery via a mechanical switch. The voltage is held nearly constant by the battery and the power flow is controlled by adjusting the fuel cell operating parameters (such as temperature or air flow) and by opening and closing the mechanical switch. The result is a system that operates at nearly constant voltage without the need for an expensive power conditioning system. The output of the system can then be processed via a traditional power conditioning system such as an inverter or dc-to-dc converter without the need for a wide range of input operating voltages. This reduces the cost and size of the fuel cell power conditioning system.

28 Claims, 2 Drawing Sheets

FUEL CELL SYSTEM POWER CONTROL METHOD AND SYSTEM

FIELD OF THE INVENTION

The present invention relates generally to the field of power generation, and more particularly to an improved fuel cell-based power conversion system.

BACKGROUND OF THE INVENTION

FIG. 1 shows a block diagram of a power conversion system that can be used with a fuel cell stack 10. Since the fuel source normally cannot keep up with load transients, it is often necessary to include, in addition to a power conditioner 12A, a battery 14 or other energy storage device to provide power during load transients. FIG. 1 shows a switch $S_1$ used to disconnect the fuel cell stack from the system. Switch $S_1$ may also be used to prevent reverse flow of current into the stack. Power conditioner 12A processes the power from the fuel cell stack 10 to a common dc bus 16. Power conditioner 12A must operate over a large range of input voltage since the fuel cell stack voltage changes significantly with load. A second power conditioner 12B controls the flow of power between the battery 14 (or other storage element) and the dc bus 16. A load 18 and an auxiliary power requirement 20 are also shown in FIG. 1.

The fuel cell system balance of plant (BOP) requires auxiliary power 20 to operate. The BOP may comprise blowers, pumps, or sensors. The auxiliary power 20 would normally be drawn from a relatively constant voltage source to reduce the cost of the BOP components. It would therefore be standard practice to draw the auxiliary power either from the battery 14 (through the second power conditioner 12B) or from the common dc bus 16, as is shown in FIG. 1. Since the BOP components ultimately derive their power from the fuel cell stack, the system efficiency would be higher if the BOP components were connected to the common dc bus rather than to the battery. (I.e.—it saves the extra power loss that would occur in power conditioner 12B to connect the BOP components to the common dc bus rather than to the battery.)

FIG. 2 depicts a specific example of the system illustrated in FIG. 1. The system shown in FIG. 2 could be used as a telecommunications power supply. In this example, the load 18 comprises a 48V battery (not shown) in parallel with electronic loads, and so the output of the fuel cell system should be maintained at the float voltage of the battery, approximately 55V for a nominally 48V battery. In this specific example, a first power conditioner 12A' could be a dc-to-dc converter (or boost converter when it is used to boost the fuel cell voltage) for providing a dc voltage to the dc bus. A second power converter 12B' would have to allow the power to flow in both directions to permit the battery 14' to provide power to the load 18 as well as to be recharged from the fuel cell stack 10'.

FIG. 2 also shows the maximum power-output or power-handling capability of each system component. The auxiliary load 20' is assumed to be a maximum of 400 W and the telecommunications load 18 is assumed to be 1 kW maximum. The fuel cell stack 10' should be able to provide steady-state power to both the telecommunications load 18 and to the auxiliary load 20'. The fuel cell stack 10' should therefore have a maximum power output capability of at least 1.4 kW. If the fuel cell stack is taken off-line due to momentary fuel problems, etc., then the battery 14' should be able to provide the entire load. The battery would therefore also be sized to provide 1.4 kW for the maximum expected period of fuel cell stack non-availability. Both of the power conditioners 12A' and 12B' should be sized to handle 1.4 kW of power. The system therefore contains 2.8 kW of power electronics (not including any power processing within the auxiliary or telecommunication loads).

FIG. 3 shows another possible topology to accomplish the same task as the system in FIG. 2. The system in FIG. 3 employs 2 diodes to share power between the battery 14' and the fuel cell stack 10'. This topology may or may not reduce the cost of the power electronics depending on the required charging rate of the battery and the cost of the diodes. It also causes an unwanted side effect in that the diodes produce a significant loss of efficiency in the circuit.

A goal of the present invention is to provide an improved power conversion system that avoids the shortcomings of the approaches described above.

SUMMARY OF THE INVENTION

In an exemplary embodiment of the present invention, a fuel cell or fuel cell stack is placed in parallel with a battery via a switch. The voltage on the output of the fuel cell, or stack, is held nearly constant by the battery and the power flow is controlled by adjusting the fuel cell operating parameters (such as temperature or air flow) and by opening and closing the switch. The result is a system that operates at nearly constant voltage without the need for an expensive power conditioning system. The output of the system can then be processed via a traditional power conditioning system such as an inverter or dc-to-dc converter without the need for a wide range of input operating voltages. This reduces the cost and size of the fuel cell power conditioning system.

Although it is generally known that fuel cells and PV cells can be put in parallel with a battery to charge the battery, and that the output power conditioner can operate directly from the battery, the present invention is distinguished from the prior art by the regulation of the fuel cell to match the load. The prior art either slams the battery at high charge and discharge rates (thus causing shortened battery life) or it involves the use of a very large battery compared to load size. The latter is economically feasible only when there is a need to have many hours of back-up time.

Other aspects of the present invention are described below.

DETAILED DESCRIPTION OF PREFERRED EMBODIMENTS

Figure 4:
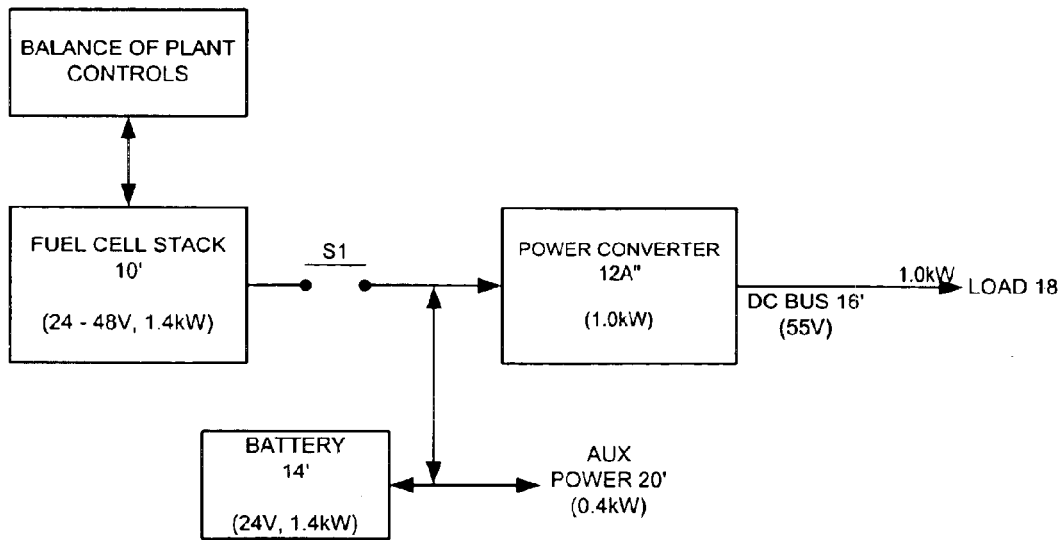
FIG. 4 illustrates a preferred embodiment of the present invention.

FIG. 4 depicts a presently preferred embodiment of the invention. In this embodiment, a fuel cell stack 10' is placed directly in parallel with an energy storage device 14' (e.g., a battery or capacitor) through a switch $S_1$. The steady-state power flow from the fuel cell stack is controlled, using BOP controls (see BOP controller in FIG. 4), by adjusting the fuel cell operating conditions such as temperature, air flow, fuel flow, air pressure or fuel pressure. The transient power flow comes from the storage device 14'. For example, when the load 18' suddenly increases, the energy storage device will provide power to meet the increase. The fuel cell operating conditions will then be adjusted to provide more power from the fuel cell stack 10'. As the fuel cell power increases, the output power from the energy storage device decreases. When the load 18 suddenly decreases, the fuel cell stack 10' will be producing more power than required by the load. The extra power will flow into the battery until the fuel cell operating conditions allow the fuel cell to produce a lower output power.

Figure 5:
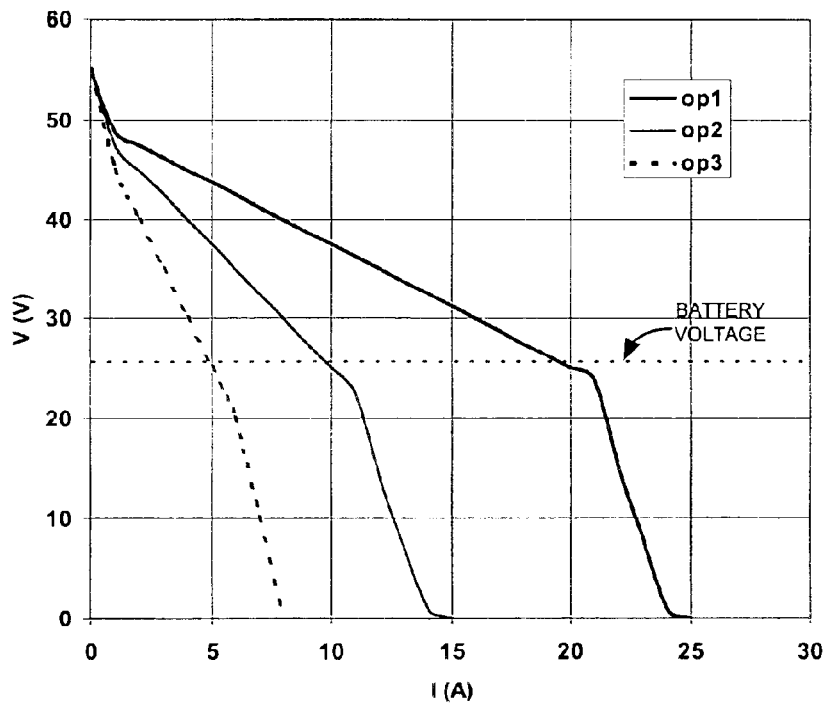
FIG. 5 depicts voltage-current curves useful for explaining the operation of the inventive system of FIG. 4.

This type of operation can be understood in more detail by examining the family of voltage-current (V-I) curves for the fuel cell stack 10' shown in FIG. 5. When the fuel cell stack is placed in parallel with a battery, it is forced to operate at a fixed voltage. The current supplied by the fuel cell stack at this voltage will depend on the operating conditions of the stack. For example, based on the V-I curves shown in FIG. 5, when the fuel cell is given operating condition op1, the current produced by the fuel cell stack would be 18A. Similarly, the current would be 9A with operating condition op2, or 5A with operating condition op3.

In some cases, a battery will not be sized to accept a large charging current for an extended period. If this is the case, then when the output load significantly decreases, it may be necessary to open switch $S_1$ for a short period of time until the fuel cell operating condition has been adjusted to match the decreased load. For the rare cases in which the battery cannot accept a large charging current for even the shortest period of time (e.g.—the time required to open mechanical switch $S_1$), then an electronically switchable load (not shown) can be added in parallel with the battery to absorb the load transient while $S_1$ opens. The electronically switchable load may also be used to reduce the number of open/close operations required of the mechanical switch, thus increasing the lifetime and reliability of the switch.

Figure 1:
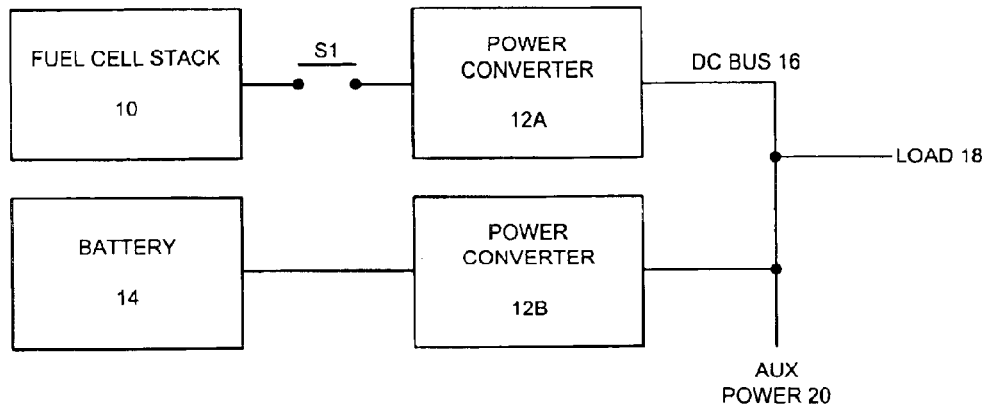
FIG. 1 schematically depicts one possible embodiment of a fuel cell-based power system exhibiting some of the problems addressed by the present invention.
Figure 2:
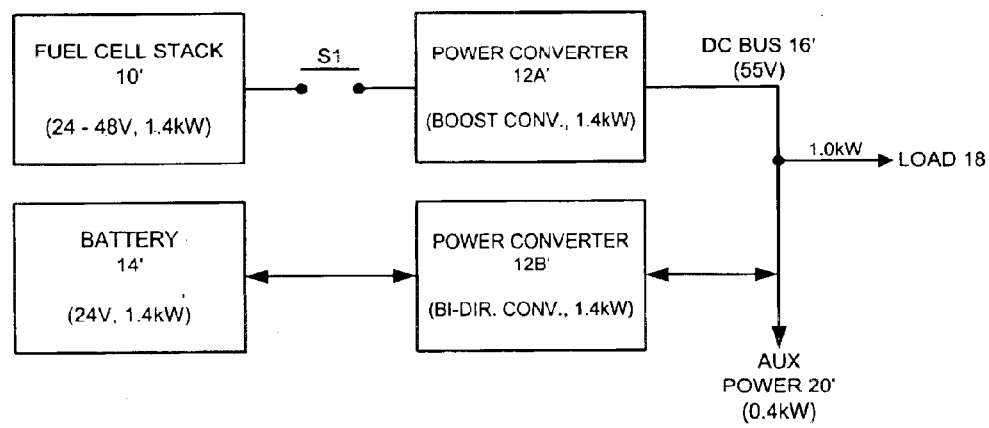
FIG. 2 depicts a more specific example of a fuel cell-based power system of the kind depicted in FIG. 1. In this example, the load is a telecommunications system.
Figure 3:
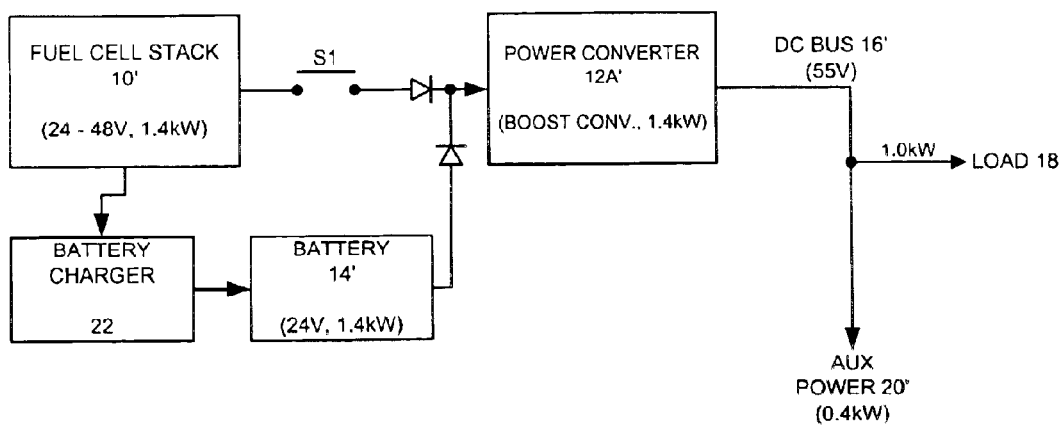
FIG. 3 depicts a variation of the approach taken with the system of FIG. 2.

The preferred embodiment of the invention allows the BOP to operate directly from the energy storage device without any efficiency penalties since the energy storage device can directly provide the auxiliary load, as is shown in FIG. 4. The efficiency of the auxiliary system is thus increased since there are no power electronics between the energy storage device and auxiliary loads. Furthermore, the size of the power electronics has been substantially reduced from the system shown in FIG. 2. The system shown in FIG. 2 contains 2.8 kW of power electronics whereas the system shown in FIG. 4 contains only 1 kW of power electronics. It should be noted that the present invention is by no means limited to these power levels, i.e., the preferred embodiment may be employed to reduce the power rating of the power electronics by a ratio of 2.8/1, and other ratios may also be achieved. Furthermore, the conditioner shown in FIG. 4 also only needs to operate from a small range of input voltages, thus simplifying the design of that conditioner. The circuit of FIG. 4 additionally removes the necessity of coordinating two power conditioners with each other, or coordinating any power conditioner with the fuel cell stack—instead, the dc-to-dc converter 12A" of FIG. 4 only needs to regulate the output voltage regardless of the fuel cell stack's operational status. The cost and complexity of the system is therefore much reduced from the system shown in FIG. 2.

Persons skilled in the art of power generation will appreciate that the components described herein as making up the preferred embodiments of the present invention are well known and may be implemented in many different forms. Thus, the present invention is by no means limited to any particular form of fuel cell, battery, power conditioner, charger, or load. Moreover, it is apparent that the present invention may be practiced without necessarily using all of these components, or by replacing some or all of these with functional equivalents. For example, the power conditioner does not have to be present. Furthermore, some fuel cell systems may not require an auxiliary load. In some applications, the battery may be replaced with a capacitor, and the capacitor may be equipped with a low power circuit to help it maintain a nearly constant voltage. The switch connecting the fuel cell to the battery may be a mechanical switch, an electrical switch, or a combination of the two. The output of the power conditioner 12A" and the load can be anything, DC, AC, or any voltage. The power conditioner is also not limited to any specific circuit topology. Moreover, the power and voltage levels are not limited to the levels mentioned above in connection with the presently preferred embodiment, although the fuel cell minimum operating voltage should be close to the battery float voltage in the case of the preferred embodiment. Accordingly, the scope of protection of the following claims is not intended to be limited to the presently preferred embodiments described herein.

I claim:

1. A power generation system for supplying power to an external load, comprising:
   (a) a fuel cell characterized by operating parameters that are controllable to control output power provided by the fuel cell;
   (b) a switch coupled to an output of the fuel cell;
   (c) an energy storage device coupled to the output of the switch;
   (d) a controller coupled to the fuel cell and switch, wherein the operating parameters and switch are controllable to control the output power provided from the fuel cell to the energy storage device; and
   (e) an internal auxiliary load, wherein the energy storage device is configured to provide power to the internal auxiliary load without said power being provided through a power conditioner that is also providing external load power.

2. A system as recited in claim 1, wherein the energy storage device is a battery and wherein the system further comprises a power conditioner coupled to the output of the battery.

3. A system as recited in claim 1, wherein the energy storage device is a battery.

4. A system as recited in claim 1, wherein the energy storage device is a capacitor.

5. A system as recited in claim 1, wherein the fuel cell operating parameters include temperature.

6. A system as recited in claim 1, wherein the fuel cell operating parameters include air flow.

7. A system as recited in claim 1, wherein the fuel cell operating parameters include fuel concentration.

8. A system as recited in claim 1, wherein the fuel cell operating parameters include air pressure.

9. A system as recited in claim 1, wherein the fuel cell operating parameters include fuel pressure.

10. A system as recited in claim 1, further comprising a power conditioner having an input coupled to the switch and an output for providing power to the load.

11. A system as recited in claim 10, wherein the power conditioner comprises a dc-to-dc converter.

12. A system as recited in claim 3, wherein the maximum output voltage of the fuel cell when the fuel cell can produce a non-negligible amount of power is near or below the nominal battery voltage.

13. A power conversion system for supplying power to an external load, comprising:
 (a) a fuel cell characterized by operating parameters that are controllable to control output power provided by the fuel cell;
 (b) a switch directly coupled to an output of the fuel cell;
 (c) an energy storage device coupled to an output of the switch; and
 (d) a controller coupled to the fuel cell and switch, wherein in response to changes in the external load, the fuel cell's operating parameters are controlled to control the output power provided from the fuel cell to the external load, and wherein the switch is controlled to control the power provided from the fuel cell to the energy storage device.

14. A system as recited in claim 13, further comprising a power conditioner comprising an input coupled to the switch and an output for providing power to the load.

15. A system as recited in claim 14, further comprising an internal auxiliary load, wherein the voltage at the input to the power conditioner is held nearly constant by the energy storage device, and wherein the energy storage device is configured to provide power to the internal auxiliary load without said power being provided through the power conditioner.

16. A system as recited in claim 13, wherein the energy storage device is a battery.

17. A system as recited in claim 13, wherein the energy storage device is a capacitor.

18. A system as recited in claim 13, wherein the fuel cell operating parameters include temperature.

19. A system as recited in claim 13, wherein the fuel cell operating parameters include air flow.

20. A system as recited in claim 13, wherein the fuel cell operating parameters include fuel concentration.

21. A system as recited in claim 13, wherein the fuel cell operating parameters include air pressure.

22. A system as recited in claim 13, wherein the fuel cell operating parameters include fuel pressure.

23. A system as recited in claim 14, wherein the power conditioner comprises an inverter.

24. A system as recited in claim 14, wherein the power conditioner comprises a dc-to-dc converter.

25. A system as recited in claim 13, wherein the maximum output voltage of the fuel cell when the fuel cell can produce a non-negligible amount of power is near or below the nominal voltage of the energy storage device.

26. A system as recited in claim 13, wherein if the external load significantly decreases, the operating conditions of the fuel cell are adjusted to decrease the power from the fuel cell and the switch is opened until the power from the fuel cell matches the decreased external load.

27. A system as recited in claim 13, wherein if the external load suddenly increases, the energy storage device provides power to meet the increase and the operating conditions of the fuel cell are adjusted to provide more power from the fuel cell.

28. A system as recited in claim 13, wherein the operating parameters are selected from the group consisting of: temperature, air flow, fuel concentration, air pressure and fuel pressure and combinations of the foregoing.

* * * * *